(12) United States Patent
Matsuura et al.

(10) Patent No.: US 8,691,108 B2
(45) Date of Patent: Apr. 8, 2014

(54) REFRIGERATION APPARATUS

(75) Inventors: Hideki Matsuura, Osaka (JP); Masaru Tanaka, Osaka (JP); Hideki Hara, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 491 days.

(21) Appl. No.: 12/920,853

(22) PCT Filed: Mar. 18, 2009

(86) PCT No.: PCT/JP2009/001208
§ 371 (c)(1),
(2), (4) Date: Sep. 3, 2010

(87) PCT Pub. No.: WO2009/116282
PCT Pub. Date: Sep. 24, 2009

(65) Prior Publication Data
US 2011/0011124 A1  Jan. 20, 2011

(30) Foreign Application Priority Data

Mar. 18, 2008 (JP) ................... 2008-070354

(51) Int. Cl.
*C09K 5/04* (2006.01)
*F25B 1/00* (2006.01)
(52) U.S. Cl.
USPC ............ 252/68; 252/67; 62/468; 62/498
(58) Field of Classification Search
USPC ................ 252/68, 67; 62/468, 498
See application file for complete search history.

(56) References Cited

U.S. PATENT DOCUMENTS

| 6,620,994 B2 * | 9/2003 | Rossi ............. 136/201 |
| 2007/0096053 A1 | 5/2007 | Nair et al. |
| 2007/0257229 A1 | 11/2007 | Tagawa et al. |
| 2010/0147016 A1 * | 6/2010 | Kaneko et al. ......... 62/468 |

FOREIGN PATENT DOCUMENTS

| JP | 1-319589 A | | 12/1989 |
| JP | 4-110388 A | | 4/1992 |
| JP | 10-147682 A | | 6/1998 |
| JP | 2002129179 A | * | 5/2002 |
| JP | 2004052730 A | * | 2/2004 |
| JP | 2005-248038 A | | 9/2005 |
| JP | 2005-281603 A | | 10/2005 |
| JP | 2005315133 A | * | 11/2005 |
| JP | 2006-274057 A | | 10/2006 |
| JP | 2007239632 A | * | 9/2007 |
| WO | 2007/086972 A2 | | 8/2007 |

OTHER PUBLICATIONS

Machine translation of JP 2004-052730 A, Feb. 19, 204.*
Machine translation of JP 2002-129179, May 9, 2002.*

* cited by examiner

*Primary Examiner* — Douglas McGinty
(74) *Attorney, Agent, or Firm* — Birch, Stewart, Kolasch & Birch, LLP.

(57) ABSTRACT

A refrigeration apparatus (20) includes a refrigerant circuit (10) in which refrigerant is circulated by a compressor (30) to perform a refrigeration cycle. The compressor (30) includes a fluid machine (82) for compressing refrigerant; and an electric motor (85) for driving the fluid machine (82). Refrigerant oil having volume resistivity of equal to or greater than $10^{10}$ Ω·m at 20° C. is used for the compressor (30).

8 Claims, 3 Drawing Sheets

REFRIGERATION APPARATUS

TECHNICAL FIELD

The present invention relates to a refrigeration apparatus in which a refrigeration cycle is performed.

BACKGROUND ART

Conventionally, a refrigeration apparatus including a refrigerant circuit in which a refrigeration cycle is performed has been broadly applied to an air conditioning system, a hot-water supply system, etc.

Patent Document 1 discloses the refrigeration apparatus of this type. The refrigeration apparatus includes a refrigerant circuit which is a closed circuit filled with refrigerant. In the refrigerant circuit, a compressor, a condenser, an expansion valve, and an evaporator are connected together. When operating the compressor, refrigerant compressed in the compressor is condensed by releasing heat to air in the condenser. The pressure of the refrigerant condensed in the condenser is reduced by the expansion valve, and then such refrigerant is evaporated in the evaporator. The evaporated refrigerant is sucked into the compressor for recompression.

Refrigerant represented by Molecular Formula 1: $C_3H_mF_n$ (note that "m" and "n" are integers equal to or greater than 1 and equal to or less than 5, and a relationship represented by an expression m+n=6 is satisfied) and having a single double bond in a molecular structure is used for the refrigerant circuit of Patent Document 1. It has been known that such refrigerant does not contain chlorine and bromine atoms, and has a small influence on destruction of the ozone layer.

CITATION LIST

Patent Document

PATENT DOCUMENT 1: Japanese Patent Application No. 04-110388

SUMMARY OF THE INVENTION

Technical Problem

The refrigerant represented by Molecular Formula 1 and having the single double bond in the molecular structure is refrigerant having relatively-low volume resistivity. That is, such refrigerant is refrigerant having relatively-low insulating properties. Thus, when using the refrigerant for the refrigeration apparatus, the volume resistivity decreases in the compressor, thereby degrading voltage insulating properties. Current of an electric motor is likely to leak through refrigerant, and therefore there is a possibility to increase the leakage current.

The present invention has been made in view of the foregoing, and it is an object of the present invention to reduce or prevent degradation of voltage insulating properties in a compressor, and reduce leakage current from an electric motor, in a refrigeration apparatus for which refrigerant represented by Molecular Formula 1: $C_3H_mF_n$ (note that "m" and "n" are integers equal to or greater than 1 and equal to or less than 5, and a relationship represented by an expression m+n=6 is satisfied) and having a single double bond in a molecular structure is used.

Solution to the Problem

A first aspect of the invention is intended for a refrigeration apparatus including a refrigerant circuit (10) in which refrigerant is circulated by a compressor (30) to perform a refrigeration cycle. The compressor (30) includes a fluid machine (82) for compressing refrigerant, and an electric motor (85) for driving the fluid machine (82). The refrigerant circuit (10) is filled with refrigerant represented by Molecular Formula 1: $C_3H_mF_n$ (note that "m" and "n" are integers equal to or greater than 1 and equal to or less than 5, and a relationship represented by an expression m+n=6 is satisfied) and having a single double bond in a molecular structure, or with refrigerant mixture containing the refrigerant. Refrigerant oil having volume resistivity of equal to or greater than $10^{10}$ Ω·m at 20° C. is used for the compressor (30).

In the first aspect of the invention, as the refrigerant of the refrigerant circuit (10), the refrigerant represented by Molecular Formula 1 and having the single double bond in the molecular structure, or the refrigerant mixture containing such refrigerant is used. In addition, the refrigerant oil having the volume resistivity of equal to or greater than $10^{10}$ Ω·m at 20° C. is used for the compressor (30). That is, the refrigerant oil having a relatively-broad range of the volume resistivity is used for the compressor (30).

A second aspect of the invention is intended for the refrigeration apparatus of the first aspect of the invention, in which the refrigerant oil mainly contains at least one of polyol ester and polyvinyl ether.

In the second aspect of the invention, the refrigerant oil mainly containing at least one of polyol ester and polyvinyl ether is used for the compressor (30). Both of polyol ester and polyvinyl ether are refrigerant oil having the relatively-high volume resistivity, and having compatibility with the refrigerant represented by Molecular Formula 1 and having the single double bond in the molecular structure, i.e., being easily dissolved with such refrigerant. Thus, in the refrigerant circuit (10), refrigerant is somewhat dissolved with the refrigerant oil.

A third aspect of the invention is intended for the refrigeration apparatus of the first or second aspect of the invention, in which the refrigerant oil has kinetic viscosity of equal to or greater than 30 cSt and equal to or less than 400 cSt at 40° C.

In the third aspect of the invention, the kinetic viscosity of the refrigerant oil is equal to or less than 400 cSt at 40° C. Thus, refrigerant is somewhat dissolved with the refrigerant oil. In addition, the kinetic viscosity of the refrigerant oil is equal to or greater than 30 cSt at 40° C. Thus, the extremely-low kinetic viscosity does not result in insufficient oil film strength, thereby ensuring lubrication.

A fourth aspect of the invention is intended for the refrigeration apparatus of any one of the first to third aspects of the invention, in which the refrigerant oil has a pour point of equal to or less than −30° C.

In the fourth aspect of the invention, the refrigerant oil having the pour point of equal to or less than −30° C. is used for the compressor (30). Thus, when performing the refrigeration cycle under a condition where an evaporation temperature of refrigerant exceeds −30° C., the refrigerant oil discharged from the compressor (30) in the refrigerant circuit (10) ensures fluidity even in a low-temperature section, and can return to the compressor (30).

A fifth aspect of the invention is intended for the refrigeration apparatus of any one of the first to fourth aspects of the invention, in which the refrigerant oil has surface tension of equal to or greater than 0.02 N/m and equal to or less than 0.04 N/m at 20° C.

In the fifth aspect of the invention, the surface tension of the refrigerant oil falls within the range of equal to or greater than 0.02 N/m and equal to or less than 0.04 N/m. If the surface tension of the refrigerant oil is extremely low, small oil droplets of the refrigerant oil are likely to be produced in gaseous refrigerant in the compressor (30), thereby discharging a relatively-large amount of the refrigerant oil from the compressor (30) together with refrigerant. Thus, there is a possibility that the amount of the refrigerant oil to be discharged from the compressor (30) together with refrigerant is significantly increased. On the other hand, if the surface tension of the refrigerant oil is extremely high, the refrigerant oil discharged from the compressor (30) is likely to have large oil droplets in the refrigerant circuit (10). Thus, the refrigerant oil discharged from the compressor (30) is difficult to be pushed to flow by refrigerant, and difficult to return to the compressor (30). In the fifth aspect of the invention, the refrigerant oil is used, which has the surface tension falling within the range in which the small oil droplets resulting in the discharge of the large amount of the refrigerant oil from the compressor (30) are less likely to be produced, and the large oil droplets resulting in the difficulty in ensuring the flow of the refrigerant oil by refrigerant are less likely to be produced.

A sixth aspect of the invention is intended for the refrigeration apparatus of any one of the first to fifth aspects of the invention, in which, in the compressor (30), as insulating material of the electric motor (85), one or more materials selected from the following are used: polyvinyl formal, polyester, THEIC modified polyester, polyamide, polyamide imide, polyester imide, polyester amide imide, polyethylene terephthalate, polyethylene naphthalate, polybutylene terephthalate, polyphenylene sulfide, polyether ether ketone, liquid crystal polymer, and epoxy resin.

A seventh aspect of the invention is intended for the refrigeration apparatus of any one of the first to sixth aspects of the invention, in which the refrigerant represented by Molecular Formula 1: $C_3H_mF_n$ (note that "m" and "n" are the integers equal to or greater than 1 and equal to or less than 5, and the relationship represented by the expression m+n=6 is satisfied) and having the single double bond in the molecular structure is 2,3,3,3-tetrafluoro-1-propene.

In the seventh aspect of the invention, the refrigerant filling the refrigerant circuit (10) is the single component refrigerant of 2,3,3,3-tetrafluoro-1-propene, or the refrigerant mixture containing 2,3,3,3-tetrafluoro-1-propene.

An eighth aspect of the invention is intended for the refrigeration apparatus of any one of the first to seventh aspects of the invention, in which refrigerant filling the refrigerant circuit (10) is refrigerant mixture containing the refrigerant represented by Molecular Formula 1: $C_3H_mF_n$ (note that "m" and "n" are the integers equal to or greater than 1 and equal to or less than 5, and the relationship represented by the expression m+n=6 is satisfied) and having the single double bond in the molecular structure, and difluoromethane.

In the eighth aspect of the invention, as the refrigerant of the refrigerant circuit (10), the refrigerant mixture is used, which contains the refrigerant represented by Molecular Formula 1 and having the single double bond in the molecular structure, and difluoromethane. The refrigerant represented by Molecular Formula 1 and having the single double bond in the molecular structure is so-called "low-pressure refrigerant." Thus, when using, e.g., single component refrigerant of the refrigerant represented by Molecular Formula 1 and having the single double bond in the molecular structure, an influence of a pressure loss of refrigerant on an operational efficiency of a refrigeration apparatus (20) is relatively large, resulting in relatively greater degradation of an actual operational efficiency as compared to a theoretical operational efficiency. Thus, in the eighth aspect of the invention, difluoromethane which is so-called "high-pressure refrigerant" is added to the refrigerant represented by Molecular Formula 1 and having the single double bond in the molecular structure.

A ninth aspect of the invention is intended for the refrigeration apparatus of the any one of the first to seventh aspects of the invention, in which refrigerant filling the refrigerant circuit (10) is refrigerant mixture containing the refrigerant represented by Molecular Formula 1: $C_3H_mF_n$ (note that "m" and "n" are the integers equal to or greater than 1 and equal to or less than 5, and the relationship represented by the expression m+n=6 is satisfied) and having the single double bond in the molecular structure, and pentafluoroethane.

In the ninth aspect of the invention, as the refrigerant of the refrigerant circuit (10), the refrigerant mixture is used, which contains the refrigerant represented by Molecular Formula 1 and having the single double bond in the molecular structure, and pentafluoroethane. The refrigerant represented by Molecular Formula 1 and having the single double bond in the molecular structure is low-flammable refrigerant. Thus, in the ninth aspect of the invention, pentafluoroethane which is non-flammable refrigerant is added to the refrigerant represented by Molecular Formula 1 and having the single double bond in the molecular structure.

A tenth aspect of the invention is intended for a refrigerant apparatus a refrigerant circuit (10) in which refrigerant is circulated by a compressor (30) to perform a refrigeration cycle. The compressor (30) includes a fluid machine (82) for compressing refrigerant, and an electric motor (85) for driving the fluid machine (82). The refrigerant circuit (10) is filled with refrigerant represented by Molecular Formula 1: $C_3H_mF_n$ (note that "m" and "n" are integers equal to or greater than 1 and equal to or less than 5, and a relationship represented by an expression m+n=6 is satisfied) and having a single double bond in a molecular structure, or with refrigerant mixture containing the refrigerant. In the compressor (30), as insulating material of the electric motor (85), one or more materials selected from the following are used: polyvinyl formal, polyester, THEIC modified polyester, polyamide, polyamide imide, polyester imide, polyester amide imide, polyethylene terephthalate, polyethylene naphthalate, polybutylene terephthalate, polyphenylene sulfide, polyether ether ketone, liquid crystal polymer, and epoxy resin.

In the sixth and tenth aspects of the invention, as the insulating material of the electric motor (85), one or more materials selected from the following are used: polyvinyl formal, polyester, THEIC modified polyester, polyamide, polyamide imide, polyester imide, polyester amide imide, polyethylene terephthalate, polyethylene naphthalate, polybutylene terephthalate, polyphenylene sulfide, polyether ether ketone, liquid crystal polymer, and epoxy resin. Such materials have properties which are not likely to be physically or chemically denatured by high-temperature high-pressure refrigerant. Thus, in the electric motor (85), the insulating material is not likely to be denatured even if the insulating material contacts refrigerant, and therefore insulating properties of the insulating material are not likely to be degraded.

Advantages of the Invention

In the present invention, in the refrigerant apparatus for which the refrigerant represented by Molecular Formula 1 and having the single double bond in the molecular structure is used, the refrigerant oil having the relatively-broad range of the volume resistivity is used for the compressor (30). Thus, in a casing (70) of the compressor (30), the volume resistivity of fluid mixture of refrigerant and the refrigerant oil is a somewhat high value. Consequently, leakage current from the electric motor (85) can be reduced in the compressor (30).

In the second aspect of the invention, the refrigerant oil mainly containing at least one of polyol ester and polyvinyl ether which are easily dissolved with the refrigerant represented by Molecular Formula 1 and having the single double bond in the molecular structure is used for the compressor (30). Thus, refrigerant is somewhat dissolved with the refrigerant oil in the refrigerant circuit (10).

The fluidity of the refrigerant oil discharged from the compressor (30) together with refrigerant is increased by dissolving refrigerant with the refrigerant oil, thereby easily moving in the refrigerant circuit (10). If refrigerant is not likely to be dissolved with the refrigerant oil, the refrigerant oil discharged from the compressor (30) is difficult to return to the compressor (30). Thus, there is a possibility to cause a shortage of the refrigerant oil in the compressor (30), resulting in inadequate lubrication in the compressor (30). If the inadequate lubrication is caused in the compressor (30), refrigerant is decomposed due to friction heat, thereby decreasing the volume resistivity of refrigerant. The refrigerant represented by Molecular Formula 1 and having the single double bond in the molecular structure has relatively-low stability, and therefore there is a possibility to extremely decreasing the volume resistivity when the inadequate lubrication is caused.

On the other hand, in the second aspect of the invention, refrigerant is somewhat dissolved with the refrigerant oil, and therefore the refrigerant oil discharged from the compressor (30) easily returns to the compressor (30). Thus, a sufficient storage amount of the refrigerant oil in the compressor (30) can be ensured, thereby reducing the inadequate lubrication due to the shortage of the refrigerant oil in the compressor (30). The decomposition of refrigerant due to the inadequate lubrication can be reduced, thereby reducing the decrease in volume resistivity of refrigerant. Consequently, an increase in leakage current from the electric motor (85) due to the decomposition of refrigerant can be reduced.

In the third aspect of the invention, the refrigerant oil is used, which has the kinetic viscosity falling within the range in which the lubrication can be ensured, and refrigerant is somewhat dissolved with the refrigerant oil. This reduces the inadequate lubrication in the compressor (30), thereby reducing the decomposition of refrigerant due to the inadequate lubrication. Thus, the increase in leakage current from the electric motor (85) due to the decomposition of refrigerant can be reduced.

In the fourth aspect of the invention, when performing the refrigeration cycle under the condition where the evaporation temperature of refrigerant exceeds −30° C., the fluidity of the refrigerant oil can be ensured even in the low-temperature section of the refrigerant circuit (10), and the refrigerant oil discharged from the compressor (30) can return to the compressor (30). This reduces the shortage of the refrigerant oil in the compressor (30). Thus, the inadequate lubrication in the compressor (30) can be reduced, thereby reducing the decomposition of refrigerant due to the inadequate lubrication. Consequently, the increase in leakage current from the electric motor (85) due to the decomposition of refrigerant can be reduced.

In the fifth aspect of the invention, the refrigerant oil is used, which has the surface tension falling within the range in which the small oil droplets resulting in the discharge of the large amount of the refrigerant oil from the compressor (30) are less likely produced, and the large oil droplets resulting in the difficulty in ensuring the flow of the refrigerant oil by refrigerant are less likely to be produced. The amount of the refrigerant oil to be discharged from the compressor (30) together with refrigerant is reduced. The refrigerant oil discharged from the compressor (30) is easily washed out by refrigerant, and then returns to the compressor (30). The sufficient storage amount of the refrigerant oil in the compressor (30) can be ensured. Thus, the inadequate lubrication due to the shortage of the refrigerant oil in the compressor (30) can be reduced, thereby reducing the decomposition of refrigerant due to the inadequate lubrication. Consequently, the increase in leakage current from the electric motor (85) due to the decomposition of refrigerant can be reduced.

In the eighth aspect of the invention, difluoromethane which is the so-called "high-pressure refrigerant" is added to the refrigerant represented by Molecular Formula 1 and having the single double bond in the molecular structure. This reduces the influence of the pressure loss of refrigerant on the operational efficiency of the refrigeration apparatus (20), thereby improving the actual operational efficiency of the refrigeration apparatus (20).

In the ninth aspect of the invention, pentafluoroethane which is the non-flammable refrigerant is added to the refrigerant represented by Molecular Formula 1 and having the single double bond in the molecular structure. Thus, the refrigerant of the refrigerant circuit (10) is less likely to catch fire, thereby improving reliability of the refrigeration apparatus (20).

In the sixth and tenth aspects of the invention, the material having the insulating properties which are not likely to be degraded even if such material contacts refrigerant is used as the insulating material of the electric motor (85). This avoids the degradation of the insulating properties of the insulating material of the electric motor (85), thereby reducing the increase in leakage current from the electric motor (85).

DESCRIPTION OF REFERENCE CHARACTERS

10 Refrigerant Circuit
11 Outdoor Heat Exchanger
15 Indoor Heat Exchanger
20 Refrigeration Apparatus
22 Outdoor Unit
23 Indoor Unit
30 Compressor

DESCRIPTION OF EMBODIMENTS

Embodiments of the present invention will be described in detail hereinafter with reference to the drawings.

Figure 1:
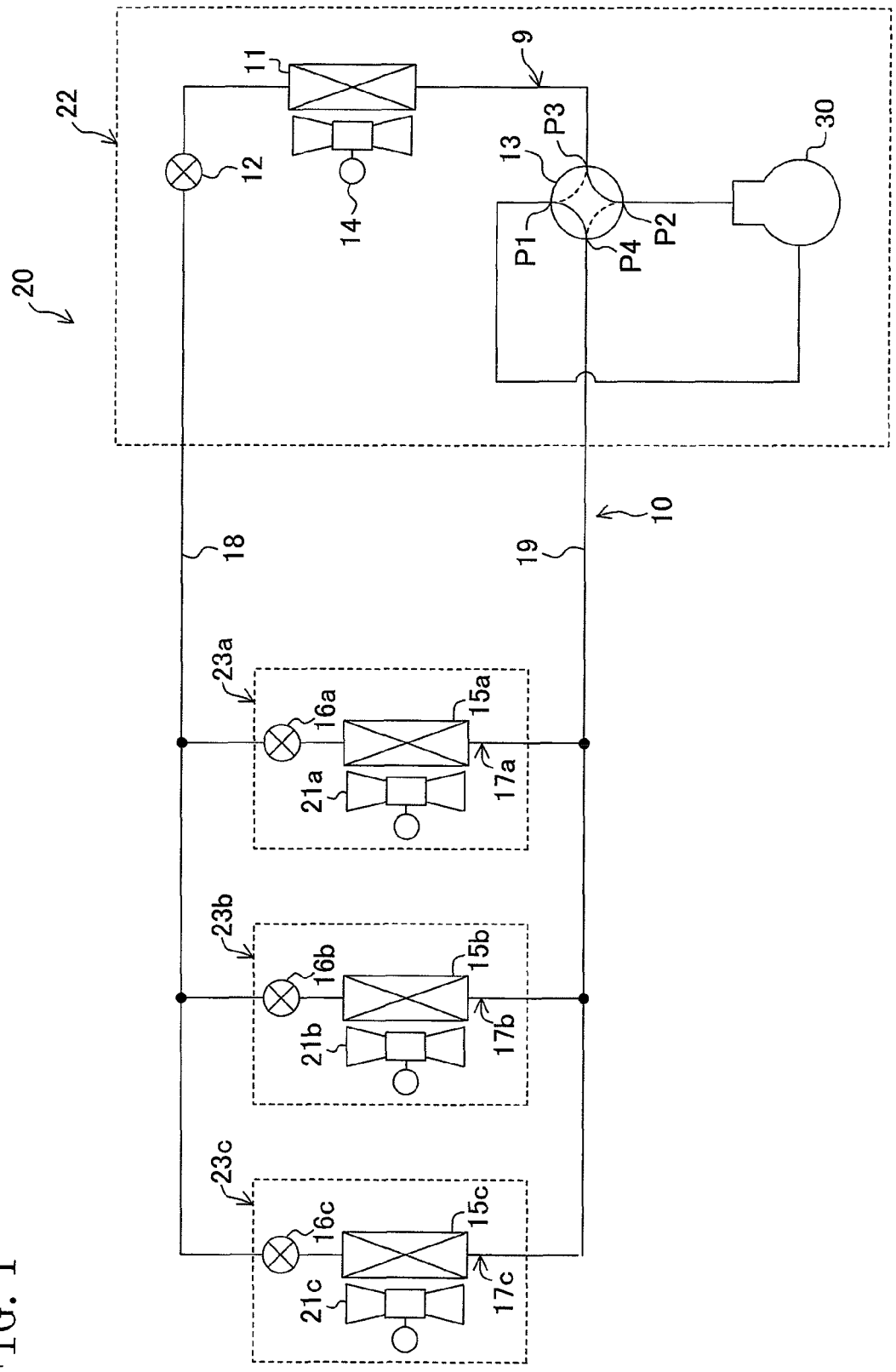
FIG. 1 is a schematic configuration diagram of a refrigeration apparatus of an embodiment.

The present embodiment is intended for an air conditioning system (20) including a refrigeration apparatus (20) of the present invention. As illustrated in FIG. 1, the air conditioning system (20) of the present embodiment includes an outdoor unit (22) and three indoor units (23a, 23b, 23c). The number of the indoor units (23a, 23b, 23c) is set forth merely for purposes of examples.

The air conditioning system (20) includes a refrigerant circuit (10) filled with refrigerant to perform a refrigeration cycle. The refrigerant circuit (10) includes an outdoor circuit (9) accommodated in the outdoor unit (22); and an indoor circuit (17a, 17b, 17c) accommodated in each of the indoor units (23a, 23b, 23c). The indoor circuits (17a, 17b, 17c) are connected to the outdoor circuit (9) through a fluid-side communication pipe (18) and a gas-side communication pipe (19). The indoor circuits (17a, 17b, 17c) are connected to each other in parallel.

The refrigerant circuit (10) of the present embodiment is filled with single component refrigerant of 2,3,3,3-tetrafluoro-1-propene (hereinafter referred to as "HFO-1234yf") as refrigerant. Note that a chemical formula of the HFO-1234yf is represented by an expression $CF_3—CF=CH_2$.

<Configuration of Outdoor Circuit>

The outdoor circuit (9) includes a compressor (30), an outdoor heat exchanger (11), an outdoor expansion valve (12), and a four-way switching valve (13).

The compressor (30) is, e.g., an inverter compressor with variable operational capacity. Electric power is supplied to the compressor (30) through an inverter. A discharge side of the compressor (30) is connected to a second port (P2) of the four-way switching valve (13), and a suction side of the compressor (30) is connected to a first port (P1) of the four-way switching valve (13). The compressor (30) will be described in detail later.

The outdoor heat exchanger (11) is a cross-fin type fin-and-tube heat exchanger. An outdoor fan (14) is provided near the outdoor heat exchanger (11). In the outdoor heat exchanger (11), heat is exchanged between outdoor air and refrigerant. One end of the outdoor heat exchanger (11) is connected to a third port (P3) of the four-way switching valve (13), and the other end is connected to the outdoor expansion valve (12). A fourth port (P4) of the four-way switching valve (13) is connected to the gas-side communication pipe (19).

The outdoor expansion valve (12) is provided between the outdoor heat exchanger (11) and a fluid-side end of the outdoor circuit (9). The outdoor expansion valve (12) is an electric expansion valve with variable opening.

The four-way switching valve (13) is switchable between a first state in which the first port (P1) communicates with the fourth port (P4), and the second port (P2) communicates with the third port (P3) (state indicated by a solid line in FIG. 1); and a second state in which the first port (P1) communicates with the third port (P3), and the second port (P2) communicates with the fourth port (P4) (state indicated by a dashed line in FIG. 1).

<Configuration of Indoor Circuit>

In each of the indoor circuits (17a, 17b, 17c), an indoor heat exchanger (15a, 15b, 15c) and an indoor expansion valve (16a, 16b, 16c) are provided in the order from a gas-side end thereof toward a fluid-side end.

The indoor heat exchanger (15a, 15b, 15c) is a cross-fin type fin-and-tube heat exchanger. An indoor fan (21a, 21b, 21c) is provided near the indoor heat exchanger (15a, 15b, 15c). In the indoor heat exchanger (15a, 15b, 15c), heat is exchanged between room air and refrigerant. In addition, the indoor expansion valve (16a, 16b, 16c) is an electric expansion valve with variable opening.

<Configuration of Compressor>

Figure 2:
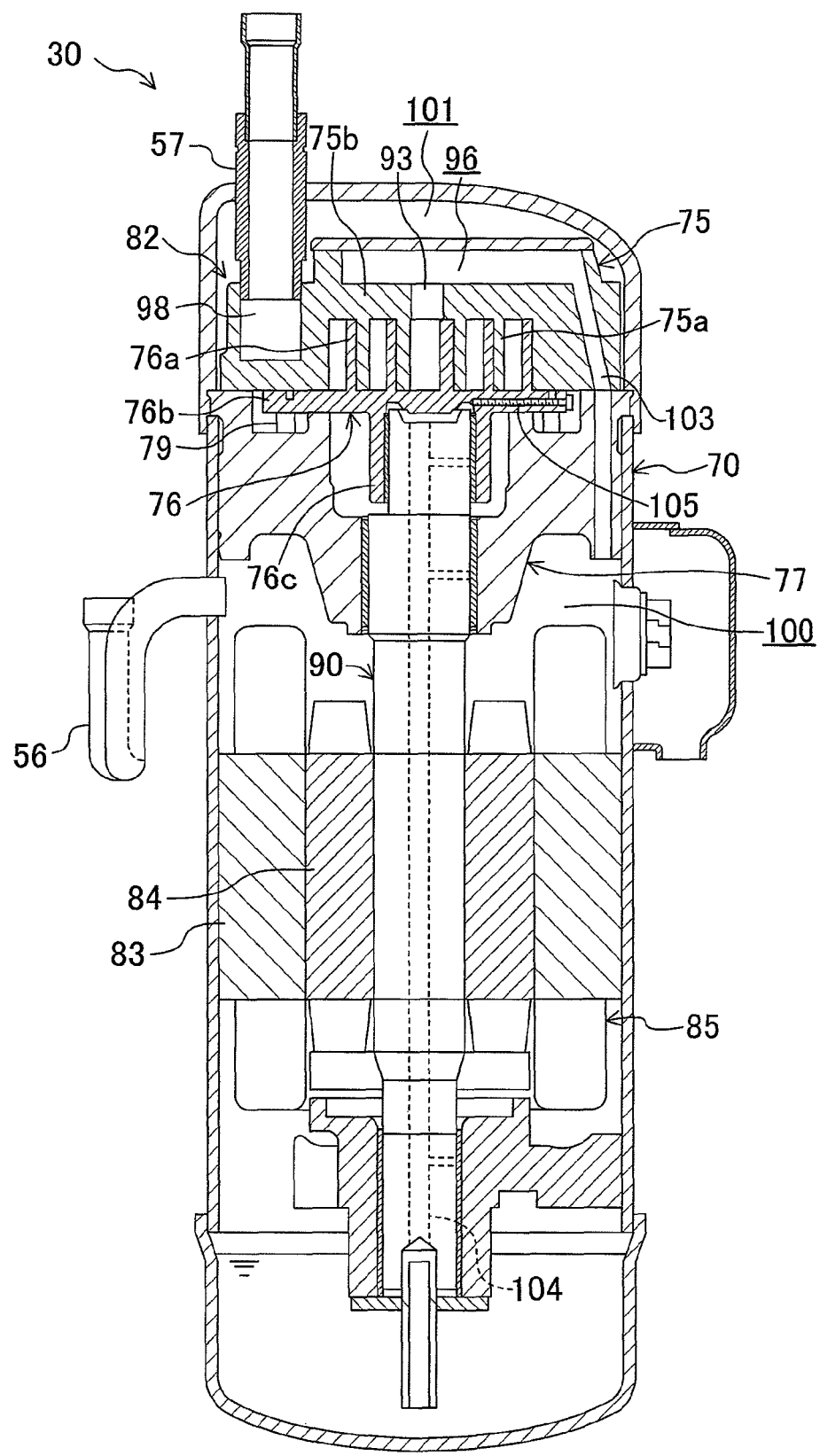
FIG. 2 is a longitudinal sectional view of a compressor of the embodiment.
Figure 3:
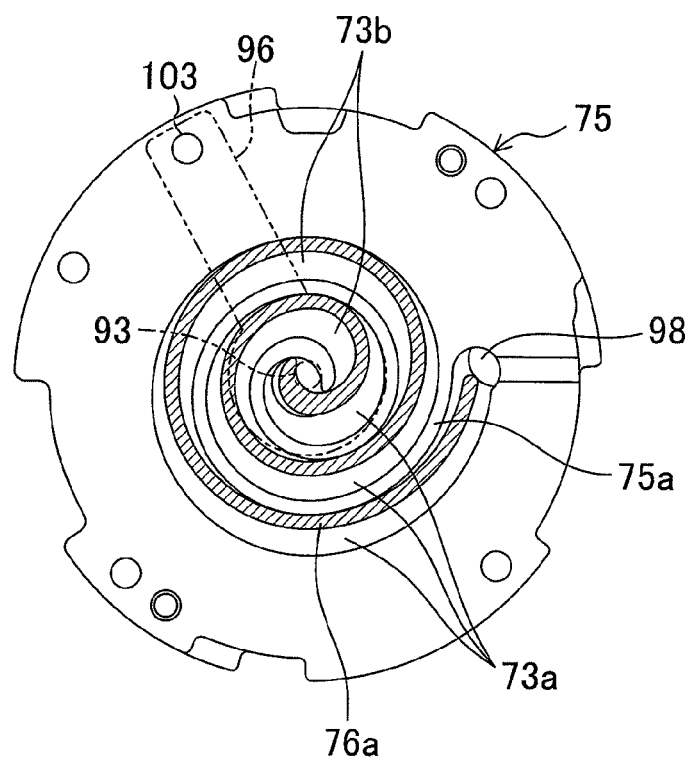
FIG. 3 is a cross sectional view of a fluid machine of the compressor of the embodiment.

The compressor (30) is, e.g., a hermetic high-pressure dome scroll-type compressor. A configuration of the compressor (30) will be described with reference to FIGS. 2 and 3.

The compressor (30) is a so-called "vertical compressor," and includes a casing (70) which is a hermetic container. An electric motor (85) and a fluid machine (82) are arranged inside the casing (70) in the order from the bottom to the top.

The electric motor (85) includes a stator (83) and a rotor (84). The stator (83) is fixed to a body section of the casing (70). On the other hand, the rotor (84) is arranged on an inner side with respect to the stator (83), and is connected to a crank shaft (90). The crank shaft (90) is supported by a lower bearing member (60) arranged near an oil sump of the casing (70).

The fluid machine (82) includes a movable scroll (76) and a fixed scroll (75), and serves as a scroll-type compression mechanism. The movable scroll (76) includes an approximately discoid movable-side end plate (76b) and a spiral movable-side wrap (76a). The movable-side wrap (76a) is vertically arranged on a front surface (upper surface) of the movable-side end plate (76b). A cylindrical protrusion (76c) to which an eccentric section of the crank shaft (90) is inserted is vertically arranged on a back surface (lower surface) of the movable-side end plate (76b). The movable scroll (76) is supported by a housing (77) arranged below the movable scroll (76), through an Oldham's ring (79). On the other hand, the fixed scroll (75) includes an approximately discoid fixed-side end plate (75b) and a spiral fixed-side wrap (75a). The fixed-side wrap (75a) is vertically arranged on a front surface (lower surface) of the fixed-side end plate (75b). In the fluid machine (82), the fixed-side wrap (75a) is engaged with the movable-side wrap (76a), thereby forming a plurality of compression chambers (73a, 73b) between contact sections of both wraps (75a, 76a).

In the compressor (30) of the present embodiment, a so-called "asymmetrical spiral structure" is employed, and the fixed-side wrap (75a) and the movable-side wrap (76a) have the different number of turns (the different length of the spiral wrap) from each other. The plurality of compression chambers (73a, 73b) includes a first compression chamber (73a) defined between an inner circumferential surface of the fixed-side wrap (75a) and an outer circumferential surface of the movable-side wrap (76a); and a second compression chamber (73b) defined between an outer circumferential surface of the fixed-side wrap (75a) and an inner circumferential surface of the movable-side wrap (76a).

In the fluid machine (82), a suction port (98) is formed in an outer edge section of the fixed scroll (75). A suction pipe (57) penetrating a top section of the casing (70) is connected to the suction port (98). The suction port (98) intermittently communicates with each of the first compression chamber (73a) and the second compression chamber (73b) in response to orbital motion of the movable scroll (76). In addition, a suction check valve (not shown in the figure) for stopping refrigerant from flowing back from the compression chamber (73a, 73b) to the suction pipe (57) is provided in the suction port (98).

In the fluid machine (82), a discharge port (93) is fowled in a center section of the fixed-side end plate (75b). The discharge port (93) intermittently communicates with each of the first compression chamber (73a) and the second compression chamber (73b) in response to the orbital motion of the movable scroll (76). The discharge port (93) opens to a muffler space (96) formed above the fixed scroll (75).

The casing (70) is divided into an upper suction space (101) and a lower discharge space (100) by the discoid housing (77). The suction space (101) communicates with the suction port (98) through a communication port which is not shown in the figure. The discharge space (100) communicates with the muffler space (96) through a communication path (103) formed through the fixed scroll (75) and the housing (77). Refrigerant discharged through the discharge port (93) flows into the discharge space (100) through the muffler space (96) during an operation, and therefore the discharge space (100) becomes a high-pressure space filled with refrigerant compressed in the fluid machine (82). A discharge pipe (56) penetrating the body section of the casing (70) opens to the discharge space (100).

For insulating material of the electric motor (85) in the compressor (30) of the present embodiment, material is used, which is not physically or chemically denatured by refrigerant even if such material contact high-temperature high-pressure refrigerant, and which particularly has solvent resistance, extraction resistance, thermal/chemical stability, and foaming resistance. The insulating material of the electric motor (85) includes, e.g., insulating coating material of windings of the stator (83); and insulating films of the stator (83) and the rotor (84).

Specifically, for the insulating coating material of the windings of the stator (83), one or more materials selected from the following are used: polyvinyl formal; polyester; THEIC modified polyester; polyamide; polyamide imide; polyester imide; and polyester amide imide. The double coated wires in which an upper layer is made of polyamide imide, and a lower layer is made of polyester imide are preferable. Enamel coating having a glass-transition temperature of equal to or greater than 120° C. may be used other than the above-described materials.

In addition, for the insulating film, one or more materials selected from the following are used: polyethylene terephthalate (PET); polyethylene naphthalate; polyphenylene sulfide (PPS); and polybutylene terephthalate (PBT). A foaming film made of the same foaming material as that of refrigerant of the refrigeration cycle may be used. For insulating material for holding windings such as insulators, one or more materials selected from polyether ether ketone (PEEK) and liquid crystal polymer (LCP) are used. Epoxy resin is used for varnish.

In the compressor (30), for sealing material, one or more materials selected from the following is used: polytetrafluoroethylene; packing made of aramid fibers or NBR; perfluoroelastomer; silicone rubber; hydrogenated NBR rubber; fluorine-containing rubber; and hydrin rubber.

The oil sump in which refrigerant oil is stored is formed in a bottom section of the casing (70). A first oil supply path (104) opening to the oil sump is formed inside the crank shaft (90). A second oil supply path (105) connected to the first oil supply path (104) is formed in the movable-side end plate (76b). In the compressor (30), refrigerant oil in the oil sump is supplied to the low-pressure-side compression chamber (73a, 73b) through the first oil supply path (104) and the second oil supply path (105).

In the present embodiment, refrigerant oil mainly containing at least one of two base oils which are polyol ester and polyvinyl ether may be used for the compressor (30). For example, for refrigerant oil of the present embodiment, refrigerant oil mainly containing only polyvinyl ether of the two base oils is used.

For the refrigerant oil of the present embodiment, refrigerant oil mainly containing polyvinyl ether having a building block represented by General Expression (I) is used. Among polyvinyl ethers, polyvinyl ether with such a structure has excellent compatibility with the refrigerant represented by Molecular Formula 1 and having the single double bond in the molecular structure.

[General Expression (I)]

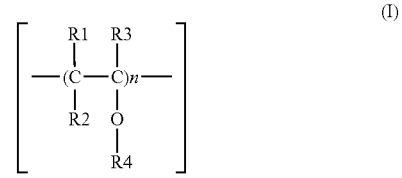

In General Expression (I), symbols "R1," "R2," and "R3" represent a hydrocarbon group in which the hydrogen or carbon number is equal to or greater than 1 and equal to or less than 8. The symbols "R1," "R2," and "R3" may be the same or may be different from each other. In addition, in General Expression (I), the symbol "R4" has a composition ratio at which an alkyl group with the carbon number of 1 or 2 is equal to or greater than 40% and equal to or less than 100%, and an alkyl group with the carbon number of 3 or 4 is equal to or greater than 0% and equal to or less than 60%, in each of building blocks.

The refrigerant oil of the present embodiment has volume resistivity of equal to or greater than $10^{10}$ Ω·m and equal to or less than $10^{15}$ Ω·m; kinetic viscosity of equal to or greater than 30 cSt and equal to or less than 400 cSt at 40° C.; a pour point of equal to or less than −30° C.; surface tension of equal to or greater than 0.02 N/m and equal to or less than 0.04 N/m at 20° C.; density of equal to or greater than 0.8 g/cm$^3$ and equal to or less than 1.8 g/cm$^3$ at 15° C.; a saturated water amount of equal to or greater than 2000 ppm at a temperature of 30° C. and a relative humidity of 90%; and an aniline point falling within a predetermined value range. Such property values of the refrigerant oil are the same for refrigerant oil described in a variation and other embodiments which will be described later. The property values are values of the refrigerant oil itself in a state in which refrigerant does not dissolve.

The value of the pour point is obtained by a test method specified by "JIS K 2269." The "aniline point" means a value representing solubility of, e.g., hydrocarbon solvent, and represents a temperature when a sample (refrigerant oil in the present embodiment) is cooled by mixing it with the equal volume of aniline, and the sample and the aniline no longer dissolve each other to turn them cloudy. The value of the aniline point is obtained by a test method specified by "JIS K 2256." When selecting resin material compatible with the refrigerant represented by Molecular Formula 1 and having the single double bond in the molecular structure, it is important to select the resin material considering the aniline point of the refrigerant oil.

In the present embodiment, refrigerant oil having a relatively-broad range of the volume resistivity is used. In the casing (70) of the compressor (30), the volume resistivity of fluid mixture of refrigerant and the refrigerant oil is a somewhat high value. Thus, leakage current from the electric motor (85) is relatively reduced in the compressor (30).

In the present embodiment, polyvinyl ether which is the main component of the refrigerant oil has compatibility with the HFO-1234yf. The kinetic viscosity of the refrigerant oil is equal to or less than 400 cSt at 40° C. Thus, the HFO-1234yf is somewhat dissolved with the refrigerant oil. The pour point of the refrigerant oil is equal to or less than −30° C., thereby not bringing about a state in which the refrigerant oil does not flow in an area where low-temperature refrigerant flows. The surface tension of the refrigerant oil is equal to or less than 0.04 N/m at 20° C., and therefore the refrigerant oil discharged from the compressor (30) is less likely to produce large oil droplets, which are difficult to be pushed to flow by the refrigerant. The density of the refrigerant oil is equal to or less than 1.8 g/cm³ at 15° C., and therefore a state is avoided, in which the refrigerant oil discharged from the compressor (30) is less likely to return to the compressor (30) due to extremely-high density. Thus, the refrigerant oil discharged from the compressor (30) is dissolved with the HFO-1234yf, and then returns to the compressor (30) together with the HFO-1234yf.

The surface tension of the refrigerant oil is equal to or greater than 0.02 N/m at 20° C., and therefore small oil droplets are less likely to be produced in gaseous refrigerant inside the compressor (30). Thus, a large amount of the refrigerant oil is not discharged from the compressor (30). In addition, the density of the refrigerant oil is equal to or greater than 0.8 g/cm³ at 15° C., and therefore the extremely-low density does not result in discharge of a large amount of the refrigerant oil from the compressor (30).

As described above, in the present embodiment, the amount of the refrigerant oil to be discharged from the compressor (30) together with refrigerant is reduced. The refrigerant oil discharged from the compressor (30) is dissolved with refrigerant, and then returns to the compressor (30). Thus, a sufficient storage amount of the refrigerant oil in the compressor (30) can be ensured.

Further, the kinetic viscosity of the refrigerant oil is equal to or greater than 30 cSt at 40° C., and therefore the extremely-low kinetic viscosity does not result in insufficient oil film strength. Consequently, lubrication can be ensured. As described above, in the present embodiment, a shortage of the refrigerant oil is not caused in the compressor (30), thereby ensuring the sufficient oil film strength. This reduces the inadequate lubrication in the compressor (30), and reduces a decrease in volume resistivity of refrigerant by decomposing refrigerant due to friction heat. Thus, an increase in leakage current from the electric motor (85) due to the decomposition of refrigerant is reduced.

In the present embodiment, the saturated water amount of the refrigerant oil is equal to or greater than 2000 ppm at the temperature of 30° C. and the relative humidity of 90%, resulting in relatively-high hygroscopic properties of the refrigerant oil. This allows the refrigerant oil to trap a certain amount of moisture in the HFO-1234yf. The HFO-1234yf has a molecular structure which tends to be altered/deteriorated due to an influence of contained moisture. Thus, a hygroscopic effect of the refrigerant oil can reduce such deterioration.

In the present embodiment, the refrigerant oil is used, which has the aniline point falling within the predetermined value range in which insulating properties of the insulating material of the electric motor (85), which is resin, are not degraded. If the aniline point is extremely low, the refrigerant oil expands the insulating material of the electric motor (85), which is resin, thereby degrading the insulating properties. On the other hand, if the aniline point is extremely high, the refrigerant oil contracts the insulating material of the electric motor (85), thereby enhancing hardness of the insulating material. Vibration of the compressor (30) is likely to damage the insulating material, and there is a possibility to degrade the insulating properties of the electric motor (85). Thus, in the present embodiment, the refrigerant oil is used, which has the aniline point falling within the predetermined value range in which the insulating material of the electric motor (85) is not expanded, and is not hardened. That is, the refrigerant oil is used, which has the aniline point falling within the predetermined value range in which the insulating properties of the electric motor (85) are not degraded. This avoids the degradation of the insulating properties of the insulating material of the electric motor (85) due to an influence of the refrigerant oil.

An acid trapping agent, an extreme pressure additive, an antioxidizing agent, an antifoam agent, an oiliness agent, and a copper deactivator are added to the refrigerant oil of the present embodiment as additives. All of the six additives are used in the present embodiment. However, each of the additives may be added as necessary, and only a single type of additive may be added. A compounding amount of each additive is set so that the proportion contained in the refrigerant oil is equal to or greater than 0.01% by mass and equal to or less than 5% by mass. Compounding amounts of the acid trapping agent and of the antioxidizing agent preferably fall within a range of equal to or greater than 0.05% by mass and equal to or less than 3% by mass.

For the acid trapping agent, the following can be used: epoxy compounds such as phenyl glycidyl ether, alkyl glycidyl ether, alkylene glycol glycidyl ether, cyclohexene oxide, α-olefin oxide, and epoxidized soybean oil. Among these agents, the acid trapping agents preferable in terms of the compatibility are phenyl glycidyl ether, alkyl glycidyl ether, alkylene glycol glycidyl ether, cyclohexene oxide, and α-olefin oxide. An alkyl group of alkyl glycidyl ether and an alkylene group of alkylene glycol glycidyl ether may have branches. The carbon number of such groups may be equal to or greater than 3 and equal to or less than 30; preferably equal to or greater than 4 and equal to or less than 24; and more preferably equal to or greater than 6 and equal to or less than 16. In addition, for α-olefin oxide, the total carbon number may be equal to or greater than 4 and equal to or less than 50; preferably equal to or greater than 4 and equal to or less than 24; and more preferably equal to or greater than 6 and equal to or less than 16. A single type of acid trapping agent may be used, or multiple types of acid trapping agents may be combined.

An extreme pressure additive containing phosphoric esters may be used. As phosphoric esters, the following may be used: phosphoric ester; phosphite ester; acidic phosphoric ester; acidic phosphite ester; etc. In addition, an extreme pressure additive may be used, which contains phosphoric esters such as phosphoric ester, phosphite ester, acidic phosphoric ester, and acidic phosphite ester which contain amine salt.

Phosphoric ester includes, e.g., triaryl phosphate; trialkyl phosphate; trialkyl aryl phosphate; triaryl alkyl phosphate; and trialkenyl phosphate. Further, phosphoric ester specifically includes, e.g., triphenyl phosphate; tricresyl phosphate; benzyl diphenyl phosphate; ethyl diphenyl phosphate; tributyl phosphate; ethyl dibutyl phosphate; cresyl diphenyl phosphate; dicresyl phenyl phosphate; ethyl phenyl diphenyl phosphate; diethyl phenyl phenyl phosphate; propyl phenyl diphenyl phosphate; dipropyl phenyl phenyl phosphate; triethyl phenyl phosphate; tripropyl phenyl phosphate; butyl phenyl diphenyl phosphate; dibutyl phenyl phenyl phosphate; tributyl phenyl phosphate; trihexyl phosphate; tri(2-ethylhexyl) phosphate; tridecyl phosphate; trilauryl phosphate; trimyristyl phosphate; tripalmityl phosphate; tristearyl phosphate; and trioleyl phosphate.

Phosphite ester specifically includes, e.g., triethyl phosphite; tributyl phosphite; triphenyl phosphite; tricresyl phosphite; tri(nonylphenyl) phosphite; tri(2-ethylhexyl) phosphite; tridecyl phosphite; trilauryl phosphite; triisooctyl phosphite; diphenyl isodecyl phosphite; tristearyl phosphite; and trioleyl phosphite.

Acidic phosphoric ester specifically includes, e.g., 2-ethylhexyl acid phosphate; ethyl acid phosphate; butyl acid phosphate; oleyl acid phosphate; tetracosyl acid phosphate; isodecyl acid phosphate; lauryl acid phosphate; tridecyl acid phosphate; stearyl acid phosphate; and isostearyl acid phosphate.

Acidic phosphite ester specifically includes, e.g., dibutyl hydrogen phosphite; dilauryl hydrogen phosphite; dioleyl hydrogen phosphite; distearyl hydrogen phosphite; and diphenyl hydrogen phosphite. Among the above-described phosphoric esters, oleyl acid phosphate or stearyl acid phosphate is preferable.

Mono-substituted amine of amine used for amine salt of phosphoric ester, phosphite ester, acidic phosphoric ester, or acidic phosphite ester specifically includes, e.g., butylamine; pentylamine; hexylamine; cyclohexylamine; octylamine; laurylamine; stearylamine; oleylamine; and benzylamine. Di-substituted amine specifically includes, e.g., dibutylamine; dipentylamine; dihexylamine; dicyclohexylamine; dioctylamine; dilaurylamine; distearylamine; dioleylamine; dibenzylamine; stearyl monoethanolamine; decyl monoethanolamine; hexyl monopropanolamine; benzyl monoethanolamine; phenyl monoethanolamine; and tolyl monopropanolamine. Tri-substituted amine specifically includes, e.g., tributylamine; tripentylamine; trihexylamine; tricyclohexylamine; trioctylamine; trilaurylamine; tristearylamine; trioleylamine; tribenzylamine; dioleyl monoethanolamine; dilauryl monopropanolamine; dioctyl monoethanolamine; dihexyl monopropanolamine; dibutyl monopropanolamine; oleyl diethanolamine; stearyl dipropanolamine; lauryl diethanolamine; octyl dipropanolamine; butyl diethanolamine; benzyl diethanolamine; phenyl diethanolamine; tolyl dipropanolamine; xylyl diethanolamine; triethanolamine; and tripropanolamine.

In addition, extreme pressure additives other than the above may be added. For example, the following may be used: an organic sulfur compound extreme pressure additive such as monosulfides, polysulfides, sulfoxides, sulfones, thiosulfinates, oil sulfides, thiocarbonates, thiophenes, thiazoles, and methanesulfonate esters; a thiophosphate extreme pressure additive such as thiophosphate triesters; an ester extreme pressure additive such as higher fatty acids, hydroxyaryl fatty acids, polyhydric alcohol esters, and acrylic acid esters; an organic chloride extreme pressure additive such as chlorinated hydrocarbons and chlorinated carboxylic acid derivatives; an organic fluorine extreme pressure additive such as fluorinated aliphatic carboxylic acids, fluorinated ethylene resin, fluorinated alkyl polysiloxanes, and fluorinated graphites; an alcohol extreme pressure additive such as higher alcohol; and a metal compound extreme pressure additive such as naphthanates (lead naphthenate etc.), fatty acid salts (lead fatty acid etc.), thiophosphates (zinc dialkyl phosphorodithioate etc.), thiocarbamic acid salts, an organic molybdenum compound, an organotin compound, an organogermanium compound, and borate esters.

For the antioxidizing agent, a phenol antioxidizing agent or an amine antioxidizing agent may be used. The phenol antioxidizing agent includes, e.g., 2,6-di-tert-butyl-4-methylphenol (DBPC); 2,6-di-tert-butyl-4-ethylphenol; 2,2'-methylenebis(4-methyl-6-tert-butylphenol); 2,4-dimethyl-6-tert-butylphenol; and 2,6-di-tert-butylphenol. In addition, the amine antioxidizing agent includes, e.g., N,N'-diisopropyl-p-phenylenediamine; N,N'-di-sec-butyl-p-phenylenediamine; phenyl-α-naphthylamine; and N,N'-di-phenyl-p-phenylenediamine.

For the copper deactivator, benzotriazole, a derivative thereof, etc. may be used. For the antifoam agent, a silicon compound may be used. For the oiliness agent, higher alcohols may be used.

As necessary, a load withstanding additive, an oxygen trapping agent, a chlorine trapping agent, a detergent dispersant, a viscosity index improver, an antirust agent, a stabilizer, a corrosion inhibitor, a fluid-point lowering agent, etc. may be added to the refrigerant oil of the present embodiment. The oxygen trapping agent is an additive for trapping oxygen. A compounding amount of each additive may be set so that the proportion contained in the refrigerant oil is equal to or greater than 0.01% by mass and equal to or less than 5% by mass, preferably equal to or greater than 0.05% by mass and equal to or less than 3% by mass. The refrigerant oil of the present embodiment has a chlorine concentration of equal to or less than 50 ppm, and a sulfur concentration of equal to or less than 50 ppm.

Operation

An operation of the air conditioning system (20) will be described. The air conditioning system (20) can perform a cooling operation and a heating operation, and switches between the cooling operation and the heating operation by the four-way switching valve (13).

<<Cooling Operation>>

In the cooling operation, the four-way switching valve (13) is set to the first state. In such a state, when operating the compressor (30), high-pressure refrigerant discharged from the compressor (30) is condensed by releasing heat to outdoor air in the outdoor heat exchanger (11). The refrigerant condensed in the outdoor heat exchanger (11) is distributed to each of the indoor circuits (17a, 17b, 17c). The pressure of the refrigerant flowing into the indoor circuit (17a, 17b, 17c) is reduced by the indoor expansion valve (16a, 16b, 16c), and then such refrigerant is evaporated by absorbing heat from room air in the indoor heat exchanger (15a, 15b, 15c). Meanwhile, room air is cooled and supplied to a room.

The refrigerant evaporated in the indoor circuit (17a, 17b, 17c) joins the refrigerant evaporated in the other indoor circuits (17a, 17b, 17c), and then returns to the outdoor circuit (9). In the outdoor circuit (9), the refrigerant returned from the indoor circuits (17a, 17b, 17c) is recompressed in the compressor (30), and then such refrigerant is discharged. During the cooling operation, a superheat degree control is performed, in which the opening of the indoor expansion valve (16a, 16b, 16c) is controlled so that the degree of superheat of refrigerant at an outlet port of the indoor heat exchanger (15a, 15b, 15c) is a constant value (e.g., 5° C.).

<<Heating Operation>>

In the heating operation, the four-way switching valve (13) is set to the second state. In such a state, when operating the compressor (30), high-pressure refrigerant discharged from the compressor (30) is distributed to each of the indoor circuits (17a, 17b, 17c). The refrigerant flowing into the indoor circuit (17a, 17b, 17c) is condensed by releasing heat to room air in the indoor heat exchanger (15a, 15b, 15c). Meanwhile, room air is heated and supplied to a room. The refrigerant condensed in the indoor heat exchanger (15a, 15b, 15c) joins the refrigerant condensed in the other indoor heat exchangers (15a, 15b, 15c), and such refrigerant returns to the outdoor circuit (9).

In the outdoor circuit (9), the pressure of the refrigerant returned from the indoor circuits (17a, 17b, 17c) is reduced by the outdoor expansion valve (12), and then such refrigerant is evaporated by absorbing heat from outdoor air in the outdoor heat exchanger (11). The refrigerant evaporated in the outdoor heat exchanger (11) is recompressed in the compressor (30), and then such refrigerant is discharged. During the heating operation, a subcooling control is performed, in which the opening of the indoor expansion valve (16a, 16b, 16c) is controlled so that the degree of supercool of refrigerant at the outlet port of the indoor heat exchanger (15a, 15b, 15c) is a constant value (e.g., 5° C.).

Advantages of Embodiment

In the present embodiment, in the refrigeration apparatus for which the refrigerant represented by Molecular Formula 1 and having the single double bond in the molecular structure is used, the refrigerant oil having the relatively-broad range of the volume resistivity is used for the compressor (30). Thus, in the casing (70) of the compressor (30), the volume resistivity of the fluid mixture of refrigerant and the refrigerant oil is the somewhat high value. Thus, the leakage current from the electric motor (85) is relatively reduced in the compressor (30).

In the present embodiment, the refrigerant oil mainly containing at least one of polyol ester and polyvinyl ether which are easily dissolved with the refrigerant represented by Molecular Formula 1 and having the single double bond in the molecular structure is used for the compressor (30). Thus, refrigerant is somewhat dissolved with the refrigerant oil in the refrigerant circuit (10), and therefore the refrigerant oil discharged from the compressor (30) easily returns to the compressor (30). This ensures the sufficient storage amount of the refrigerant oil in the compressor (30), thereby reducing the inadequate lubrication due to the shortage of the refrigerant oil in the compressor (30). The decomposition of refrigerant due to the inadequate lubrication can be reduced, thereby reducing the decrease in volume resistivity of refrigerant. Consequently, the increase in leakage current from the electric motor (85) due to the decomposition of refrigerant can be reduced.

In the present embodiment, the refrigerant oil is used, which has the kinetic viscosity falling within the range in which the lubrication is ensured, and refrigerant is somewhat dissolved. This reduces the inadequate lubrication in the compressor (30), thereby reducing the decomposition of refrigerant due to the inadequate lubrication. Thus, the decrease in volume resistivity of refrigerant can be reduced, and the increase in leakage current from the electric motor (85) can be reduced.

In the present embodiment, the pour point of the refrigerant oil is equal to or less than −30° C. Thus, fluidity of the refrigerant oil is ensured even in a low-temperature section of the refrigerant circuit (10), thereby allowing the refrigerant oil discharged from the compressor (30) to return to the compressor (30). This avoids the state in which the refrigerant oil discharged from the compressor (30) does not return to the compressor (30). Consequently, the inadequate lubrication in the compressor (30) can be reduced, thereby reducing the decomposition of refrigerant due to the inadequate lubrication. This reduces the decrease in volume resistivity of refrigerant, and reduces the increase in leakage current from the electric motor (85).

In the present embodiment, the refrigerant oil is used, which has the surface tension falling within the range in which the small oil droplets resulting in the discharge of the large amount of the refrigerant oil from the compressor (30) are less likely to be produced, and the large oil droplets resulting in the difficulty in ensuring the flow of the refrigerant oil by refrigerant are less likely to be produced. This reduces the amount of the refrigerant oil to be discharged from the compressor (30) together with refrigerant. The refrigerant oil discharged from the compressor (30) is easily washed out by refrigerant, and then returns to the compressor (30). Thus, the sufficient storage amount of the refrigerant oil in the compressor (30) can be ensured. Consequently, the inadequate lubrication due to the shortage of the refrigerant oil in the compressor (30) can be reduced, thereby reducing the decomposition of refrigerant due to the inadequate lubrication. This reduces the decrease in volume resistivity of refrigerant, and reduces the increase in leakage current from the electric motor (85).

In the present embodiment, the refrigerant oil is used, which has the aniline point falling within the range in which the insulating properties of the electric motor (85) are not degraded. This avoids the degradation of the insulating properties of the electric motor (85) due to the influence of the refrigerant oil, thereby reducing the increase in leakage current from the electric motor (85).

In the present embodiment, the material having the insulating properties which are not likely to be degraded even when such material contacts refrigerant is used as the insulating material of the electric motor (85). This avoid the degradation of the insulating properties of the insulating material of the electric motor (85).

Variation of Embodiment

In a variation of the present embodiment, refrigerant oil mainly containing only polyol ester of two base oils which are polyol ester and polyvinyl ether is used for the compressor (30). Any of the following is used for polyol ester: "ester of aliphatic polyhydric alcohol and linear or branched fatty acid," "partial ester of aliphatic polyhydric alcohol and linear or branched fatty acid," and "complex ester of partial ester of aliphatic polyhydric alcohol and linear or branched fatty acid having the carbon number of equal to or greater than 3 and equal to or less than 9, and aliphatic or aromatic dibasic acid." Among polyol esters, such polyol esters have excellent compatibility with refrigerant represented by Molecular Formula 1 and having the single double bond in the molecular structure.

Aliphatic polyhydric alcohol contained in the "ester of" or "partial ester of aliphatic polyhydric alcohol and linear or branched fatty acid" includes, e.g., ethylene glycol; propylene glycol; butylene glycol; neopentyl glycol; trimethylolethane; ditrimethylolethane; trimethylolpropane; ditrimethylolpropane; glycerin; pentaerythritol; dipentaerythritol; tripentaerythritol; and sorbitol. As aliphatic polyhydric alcohol, pentaerythritol, dipentaerythritol, and tripentaerythritol are preferable.

Fatty acid having the carbon number of equal to or greater than 3 and equal to or less than 12 may be used. For fatty acid, the following may be used: propionic acid; butyric acid; pivalic acid; valeric acid; caproic acid; heptanoic acid; octanoic acid; nonanoic acid; decanoic acid; dodecanoic acid; isovaleric acid; neopentanoic acid; 2-methyl-butyric acid; 2-ethylbutyric acid; 2-methyl-hexanoic acid; 2-ethyl-hexanoic acid; iso-octanoic acid; iso-nonanoic acid; iso-decanoic acid; 2,2-dimethyl-octanoic acid; 2-butyloctanoic acid; and 3,5,5-trimethylhexane acid. As fatty acid, the carbon number is preferably equal to or greater than 5 and equal to or less than 12, and more preferably equal to or greater than 5 and equal to or less than 9. Specifically, valeric acid, hexanoic acid, heptanoic acid, 2-methyl-hexanoic acid, 2-ethyl-hexanoic acid, iso-octanoic acid, iso-nonanoic acid, iso-decanoic acid, 2,2-dimethyl-octanoic acid, 2-butyloctanoic acid, 3,5,5-trimethylhexane acid, etc. are preferable.

In the "complex ester of partial ester of aliphatic polyhydric alcohol and linear or branched fatty acid having the carbon number of equal to or greater than 3 and equal to or less than 9, and aliphatic or aromatic dibasic acid," fatty acid having the carbon number of equal to or greater than 5 and equal to or less than 7 is preferable, and fatty acid having the carbon number of 5 or 6 is more preferable. Specifically, valeric acid, hexanoic acid, isovaleric acid, 2-methyl-butyric acid, 2-ethyl-butyric acid, or mixture thereof is preferable. Fatty acid may be used, in which fatty acid having the carbon number of 5 is mixed with fatty acid having the carbon number of 6 at a weight ratio equal to or greater than 10:90 and equal to or less than 90:10.

Aliphatic dibasic acid includes succinic acid, adipic acid, pimelic acid, suberic acid, azelaic acid, sebacic acid, undecanoic diacid, dodecanoic diacid, tridecanoic diacid, and docosanoic diacid. Aromatic dibasic acid includes phthalic acid and isophthalic acid. In an esterification reaction for preparing complex ester, polyhydric alcohol reacts with dibasic acid at a predetermined rate for partial esterification, and then such partial ester reacts with fatty acid. A reaction sequence of dibasic acid and fatty acid may be reversed, and dibasic acid may be mixed with fatty acid for esterification.

Other Embodiments

The foregoing embodiments may have the following configurations.

In the foregoing embodiments, refrigerant oil mainly containing both of polyol ester and polyvinyl ether may be used.

In the foregoing embodiments, as the refrigerant of the refrigerant circuit (10), single component refrigerant of refrigerant represented by Molecular Formula 1 and having the single double bond in the molecular structure, other than the HFO-1234yf may be used. Specifically, the following may be used: 1,2,3,3,3-pentafluoro-1-propene (referred to as "HFO-1225ye," and a chemical formula thereof is represented by an expression $CF_3$—$CF$=$CHF$); 1,3,3,3-tetrafluoro-1-propene (referred to as "HFO-1234ze," and a chemical formula thereof is represented by an expression $CF_3$—$CH$=$CHF$); 1,2,3,3-tetrafluoro-1-propene (referred to as "HFO-1234ye," and a chemical formula thereof is represented by an expression $CHF_2$—$CF$=$CHF$); 3,3,3-trifluoro-1-propene (referred to as "HFO-1243zf," and a chemical formula thereof is represented by an expression $CF_3$—$CH$=$CH_2$); 1,2,2-trifluoro-1-propene (a chemical formula thereof is represented by an expression $CH_3$—$CF$=$CF_2$); and 2-fluoro-1-propene (a chemical formula thereof is represented by an expression $CH_3$—$CF$=$CH_2$).

In the foregoing embodiments, refrigerant mixture may be used, which is made by adding at least one of HFC-32 (difluoromethane), HFC-125 (pentafluoroethane), HFC-134 (1,1,2,2-tetrafluoroethane), HFC-134a (1,1,1,2-tetrafluoroethane), HFC-143a (1,1,1-trifluoroethane), HFC-152a (1,1-difluoroethane), HFC-161, HFC-227ea, HFC-236ea, HFC-236fa, HFC-365mfc, methane, ethane, propane, propene, butane, isobutene, pentane, 2-methylbutane, cyclopentane, dimethyl ether, bis-trifluoromethyl-sulfide, carbon dioxide, and helium; to the refrigerant represented by Molecular Formula 1 and having the single double bond in the molecular structure (1,2,3,3,3-pentafluoro-1-propene; 2,3,3,3-tetrafluoro-1-propene; 1,3,3,3-tetrafluoro-1-propene; 1,2,3,3-tetrafluoro-1-propene; 3,3,3-trifluoro-1-propene; 1,2,2-trifluoro-1-propene; and 2-fluoro-1-propene).

Refrigerant mixture of, e.g., the HFO-1234yf and the HFC-32 may be used. In such a case, the refrigerant mixture may be used, in which the proportion of the HFO-1234yf is 78.2% by mass, and the proportion of the HFC-32 is 21.8% by mass. In addition, the refrigerant mixture may be used, in which the proportion of the HFO-1234yf is 77.6% by mass, and the proportion of the HFC-32 is 22.4% by mass. In the refrigerant mixture of the HFO-1234yf and the HFC-32, the proportion of the HFO-1234yf may be equal to or greater than 70% by mass and equal to or less than 94% by mass, and the proportion of the HFC-32 may be equal to or greater than 6% by mass and equal to or less than 30% by mass. The proportion of the HFO-1234yf is preferably equal to or greater than 77% by mass and equal to or less than 87% by mass, and the proportion of the HFC-32 may be equal to or greater than 13% by mass and equal to or less than 23% by mass. More preferably, the proportion of the HFO-1234yf is equal to or greater than 77% by mass and equal to or less than 79% by mass, and the proportion of the HFC-32 is equal to or greater than 21% by mass and equal to or less than 23% by mass.

Refrigerant mixture of the HFO-1234yf and the HFC-125 may be used. In such a case, the proportion of the HFC-125 is preferably equal to or greater than 10% by mass, and more preferably equal to or greater than 10% by mass and equal to or less than 20% by mass.

Refrigerant mixture of the HFO-1234yf, the HFC-32, and the HFC-125 may be used. In such a case, refrigerant mixture may be used, which contains the HFO-1234yf of 52% by mass, the HFC-32 of 23% by mass, and the HFC-125 of 25% by mass.

In the foregoing embodiments, a dryer filled with silicic acid or synthetic zeolite as desiccant may be provided in the refrigerant circuit (10).

In the foregoing embodiments, the compressor (30) may be a horizontal compressor, or may be other types of compressors such as reciprocating, rotary, and screw compressors.

In the foregoing embodiments, the refrigeration apparatus (20) may be an air conditioning system only for heating; a refrigerator or a freezer for cooling food; a refrigeration system in which an air conditioner is combined with a refrigerator or a freezer; or a hot-water supply system in which water is heated in a radiator of a refrigerant circuit (10). In addition, in the foregoing embodiments, a heat source of the refrigerant circuit (10) is air, but such a heat source may be a water heat source or an underground heat source.

The foregoing embodiments have been set forth merely for purposes of preferred examples in nature, and are not intended to limit the scope, applications, and use of the invention.

INDUSTRIAL APPLICABILITY

As described above, the present invention is useful for the refrigeration apparatus in which the refrigeration cycle is performed.

The invention claimed is:
1. A refrigeration apparatus, comprising:
a refrigerant circuit in which refrigerant is circulated by a compressor to perform a refrigeration cycle,
wherein the compressor includes a fluid machine for compressing refrigerant, and an electric motor for driving the fluid machine;
the refrigerant circuit is filled with refrigerant represented by Molecular Formula 1: $C_3H_mF_n$ where "m" and "n" are integers equal to or greater than 1 and equal to or less than 5, and a relationship represented by an expression m+n=6 is satisfied, and having a single double bond in a molecular structure, or with refrigerant mixture containing the refrigerant;
refrigerant oil having volume resistivity of equal to or greater than $10^{10}$ $\Omega \cdot m$ at 20° C. is used for the compressor;
the refrigerant oil has surface tension of equal to or greater than 0.02 N/m and equal to or less than 0.04 N/m at 20° C.

2. The refrigeration apparatus of claim 1, wherein
the refrigerant oil mainly contains at least one of polyester and polyvinyl ether.

3. The refrigeration apparatus of claim 1 or 2, wherein
the refrigerant oil has kinetic viscosity of equal to or greater than 30 cSt and equal to or less than 400 cSt at 40° C.

4. The refrigeration apparatus of claim 1 or 2, wherein
the refrigerant oil has a pour point of equal to or less than −30° C.

5. The refrigeration apparatus of claim 1 or 2, wherein,
in the compressor, as insulating material of the electric motor, one or more materials selected from the following are used: polyvinyl formal, polyester, THEIC modified polyester, polyamide, polyamide imide, polyester imide, polyester amide imide, polyethylene terephthalate, polyethylene naphthalate, polybutylene terephthalate, polyphenylene sulfide, polyether ether ketone, liquid crystal polymer, and epoxy resin.

6. The refrigeration apparatus of claim 1 or 2, wherein
the refrigerant represented by Molecular Formula 1: $C_3H_mF_n$ where "m" and "n" are the integers equal to or greater than 1 and equal to or less than 5, and the relationship represented by the expression m+n=6 is satisfied, and having the single double bond in the molecular structure is 2,3,3,3-tetrafluoro-1-propene.

7. The refrigeration apparatus of claim 1 or 2, wherein
refrigerant filling the refrigerant circuit is refrigerant mixture containing the refrigerant represented by Molecular Formula 1: $C_3H_mF_n$ where "m" and "n" are the integers equal to or greater than 1 and equal to or less than 5, and the relationship represented by the expression m+n=6 is satisfied, and having the single double bond in the molecular structure, and difluoromethane.

8. The refrigeration apparatus of claim 1 or 2, wherein
refrigerant filling the refrigerant circuit is refrigerant mixture containing the refrigerant represented by Molecular Formula 1: $C_3H_mF_n$ where "m" and "n" are the integers equal to or greater than 1 and equal to or less than 5, and the relationship represented by the expression m+n=6 is satisfied, and having the single double bond in the molecular structure, and pentafluoroethane.

* * * * *